United States Patent [19]

Nentl et al.

[11] Patent Number: 5,046,615
[45] Date of Patent: Sep. 10, 1991

[54] DISK SHIPPER

[75] Inventors: Robert J. Nentl, Lakeville; Dale A. Maenke, Chaska, both of Minn.

[73] Assignee: Fluoroware, Inc., Chaska, Minn.

[21] Appl. No.: 412,810

[22] Filed: Sep. 26, 1989

Related U.S. Application Data

[63] Continuation-in-part of Ser. No. 332,038, Apr. 3, 1989, abandoned.

[51] Int. Cl.⁵ .............................................. B65D 85/48
[52] U.S. Cl. .................................. 206/454; 206/334; 206/444; 206/449
[58] Field of Search ............... 206/303, 309, 328, 334, 206/449, 454, 444; 211/41

[56] References Cited

U.S. PATENT DOCUMENTS

| | | | |
|---|---|---|---|
| 3,951,587 | 4/1976 | Alliegro et al. | 432/253 |
| 4,043,451 | 8/1977 | Johnson | 206/334 |
| 4,160,504 | 7/1979 | Kudlich et al. | 206/334 |
| 4,282,973 | 8/1981 | Binkowski | 206/444 |
| 4,506,785 | 3/1985 | Seefeldt | 206/334 |
| 4,506,785 | 3/1985 | Seefeldt | 206/334 |
| 4,520,925 | 6/1985 | Johnson | 206/334 |
| 4,588,086 | 5/1986 | Coe | 206/444 |
| 4,696,385 | 9/1987 | Rivoli | 206/334 |
| 4,718,549 | 1/1988 | Rissotti et al. | 206/334 |
| 4,718,552 | 1/1988 | Rossi et al. | 206/444 |
| 4,721,207 | 1/1988 | Kikuchi | 206/334 |
| 4,724,963 | 2/1988 | Mortensen | 206/454 |
| 4,747,488 | 5/1988 | Kikuchi | 206/309 |
| 4,752,007 | 6/1988 | Rossi et al. | 206/444 |
| 4,770,724 | 10/1988 | Benz et al. | 206/303 |
| 4,779,732 | 10/1988 | Boehm et al. | 206/454 |
| 4,793,488 | 12/1988 | Mortensen | 206/454 |
| 4,793,788 | 12/1988 | Gregerson | 206/454 |
| 4,817,795 | 4/1989 | Kos | 206/328 |
| 4,817,799 | 4/1989 | Gregerson et al. | 206/445 |
| 4,840,530 | 6/1989 | Nguyen | 206/454 |
| 4,880,116 | 11/1989 | Kos | 206/454 |

Primary Examiner—David T. Fidei
Attorney, Agent, or Firm—Faegre & Benson

[57] ABSTRACT

A disk shipper assembly consists of a bottom and a cover which mates therewith in latching engagement. The bottom and cover can be handled, as a complete package, by its constituent components and in assembly and disassembly entirely by robotics. The shipper bottom is configured to permit ID or OD handling of the disk contents. The bottom is further configured to be compatible with certain existing disk carriers in manually transferring the disk content to the carrier and vice versa. Since the particular disk carrier with which the bottom of the disk shipper is compatibly designed prohibits external diameter handling, the novel disk shipper bottom facilitates transposing the disks from the carrier into a configuration that permits both ID and OD handling.

23 Claims, 10 Drawing Sheets

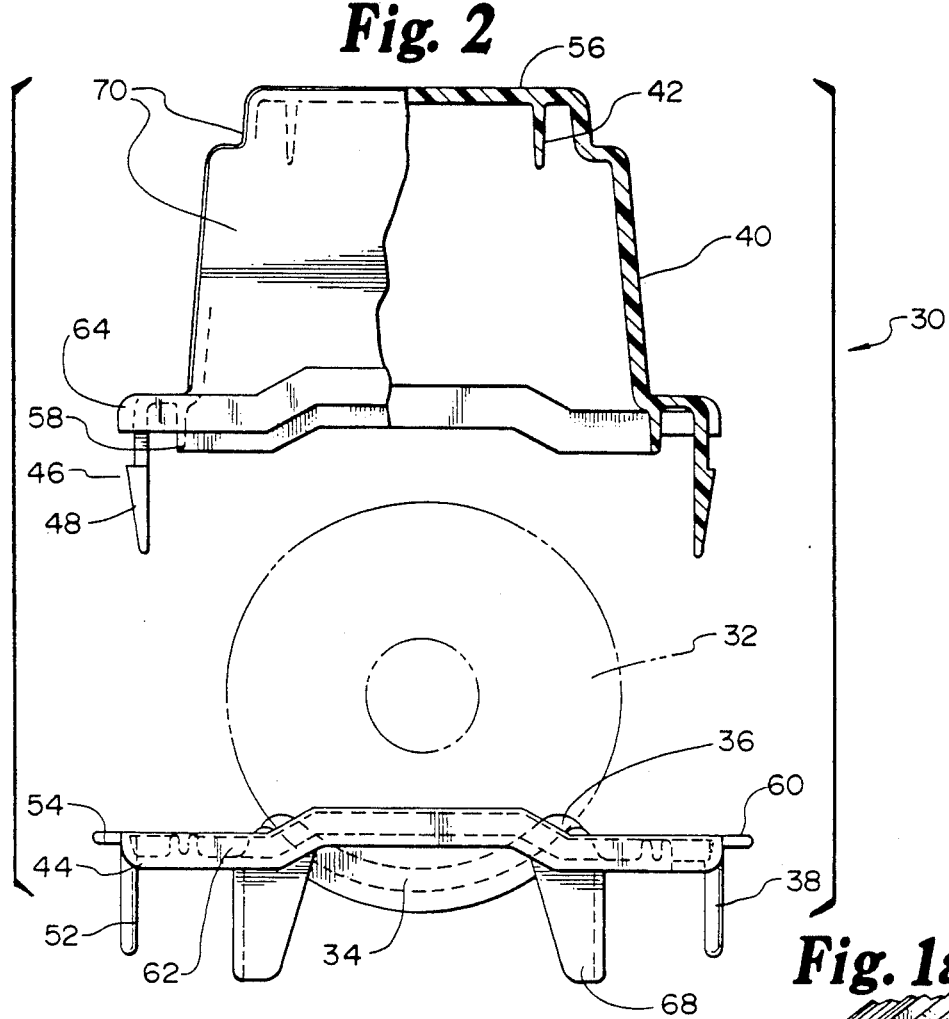
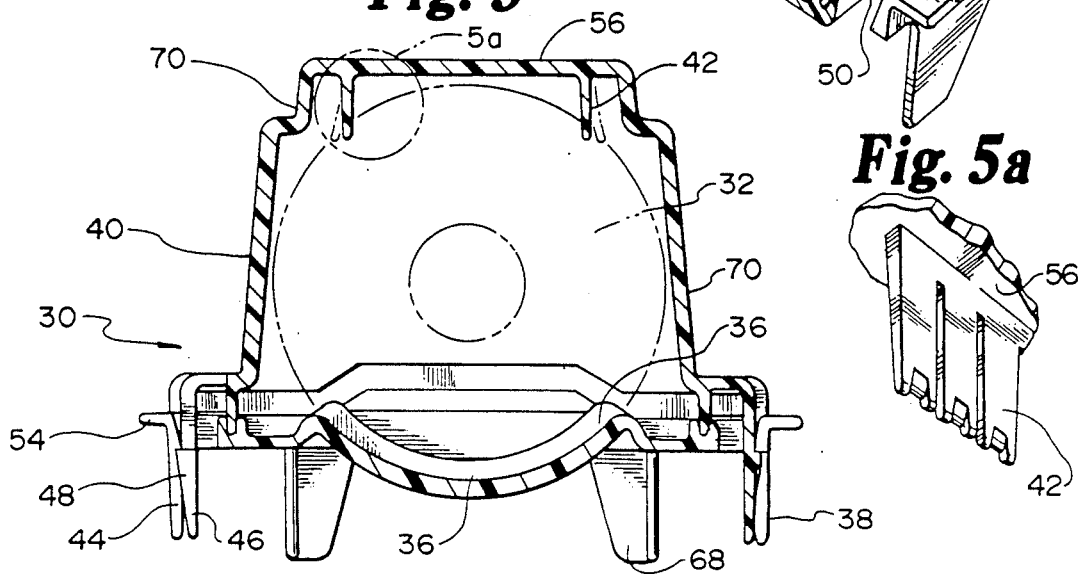

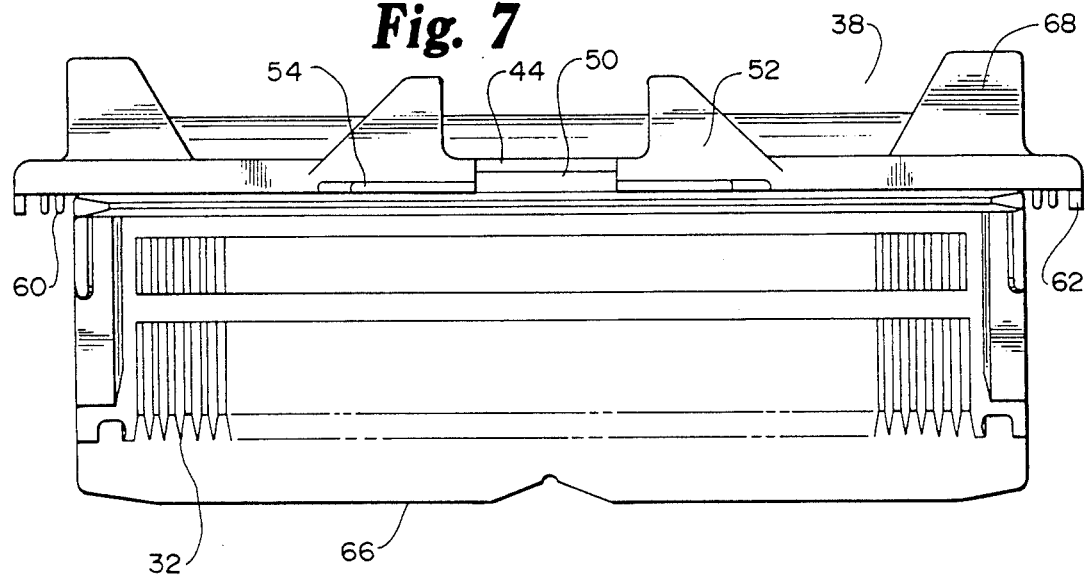
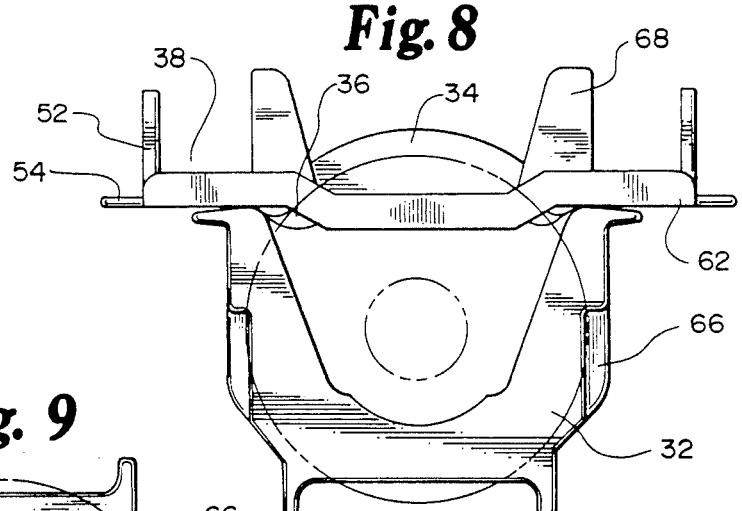
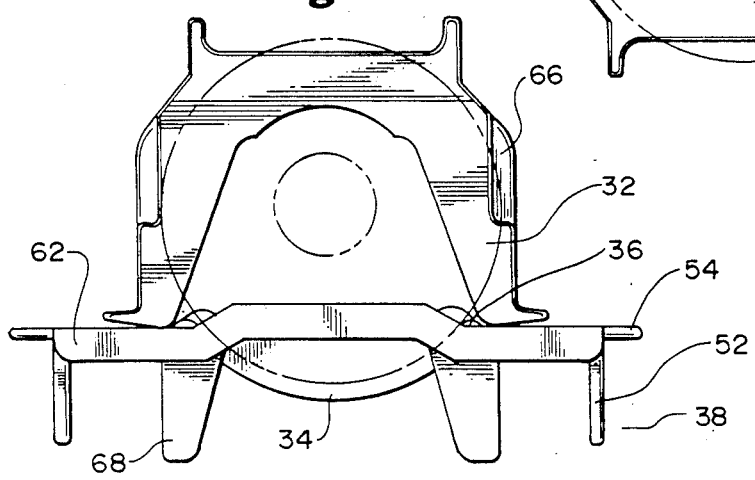

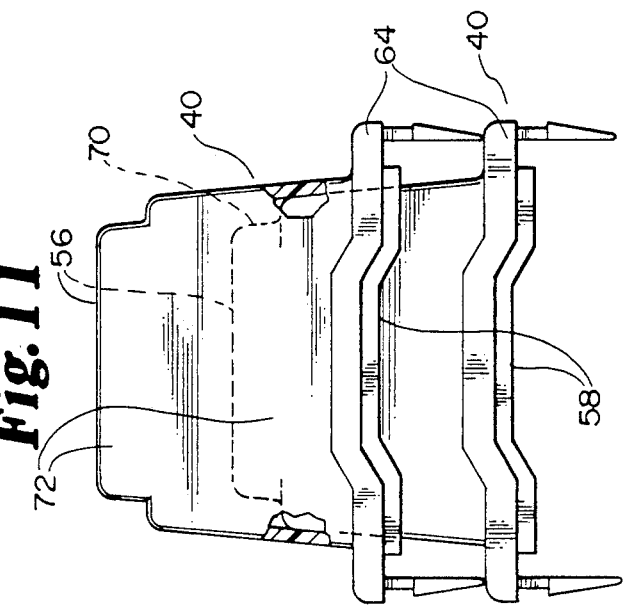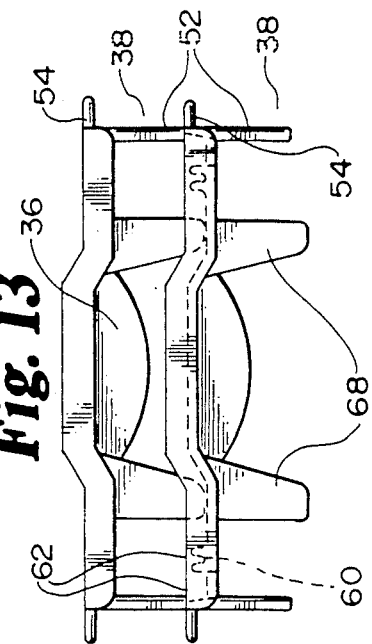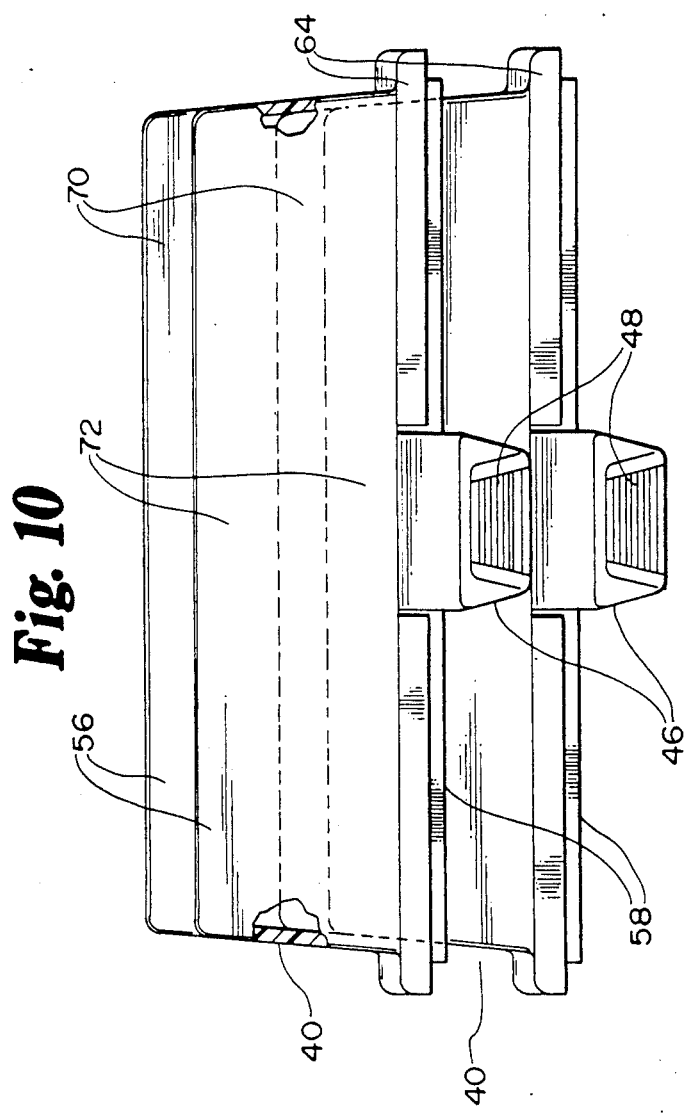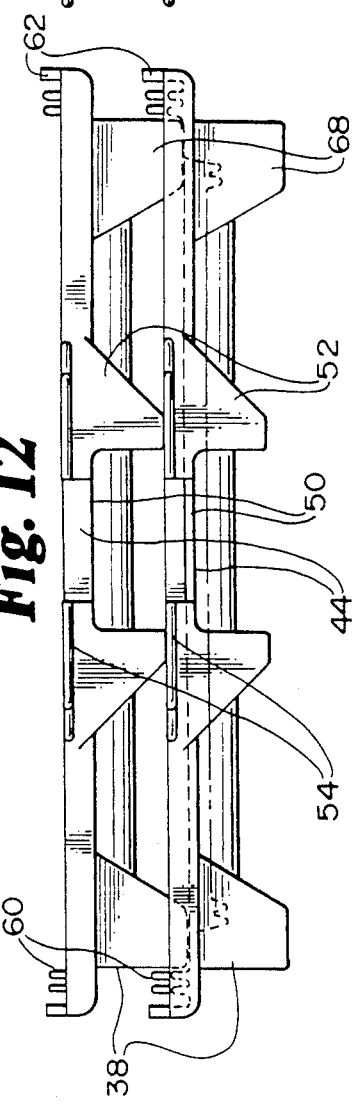

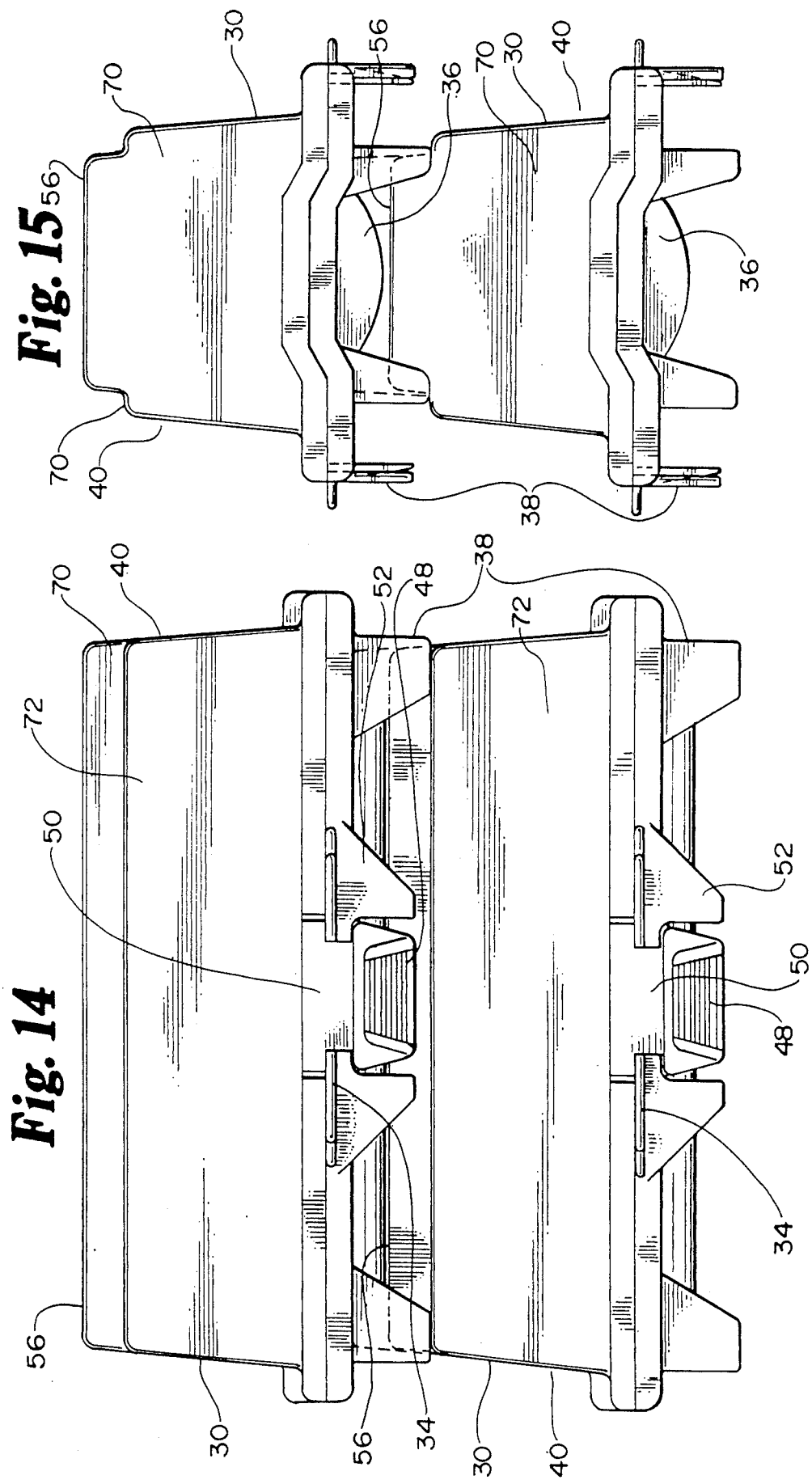

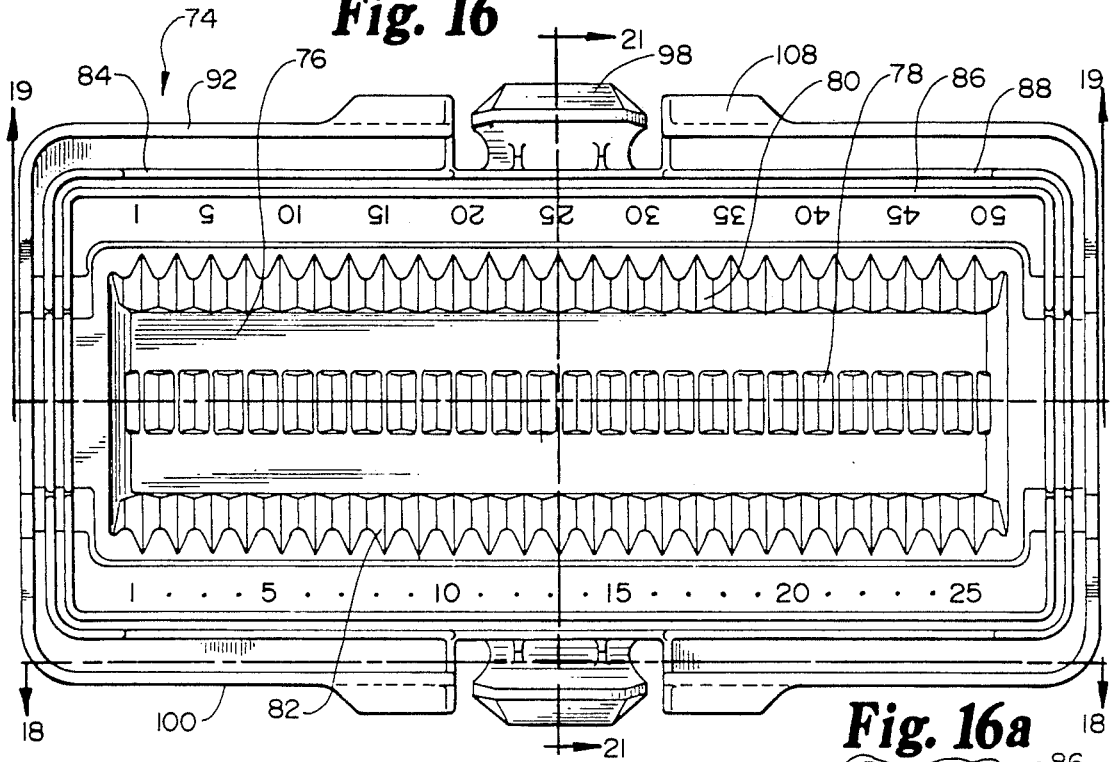
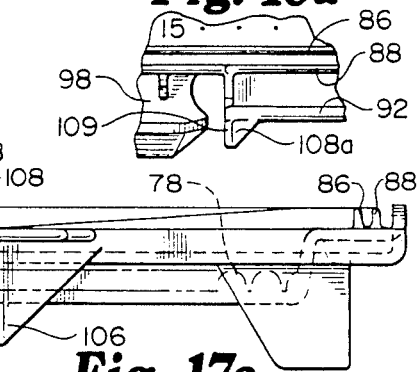
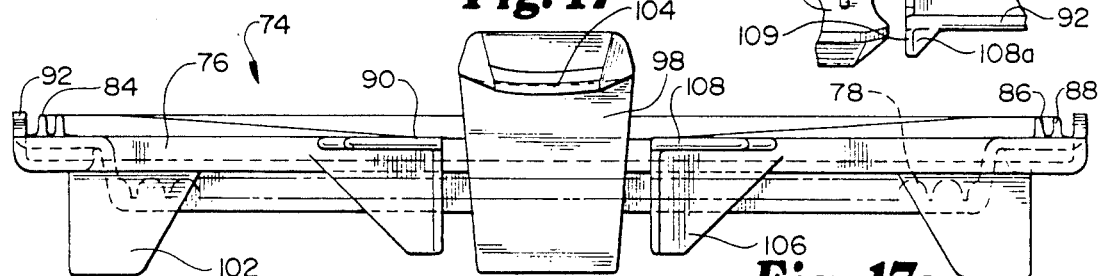
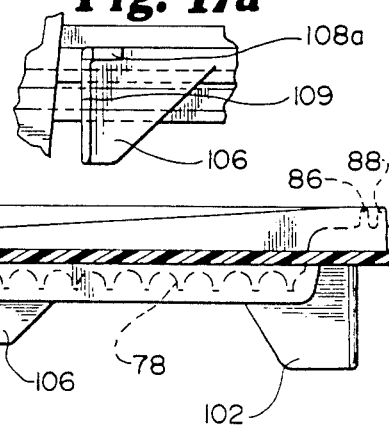
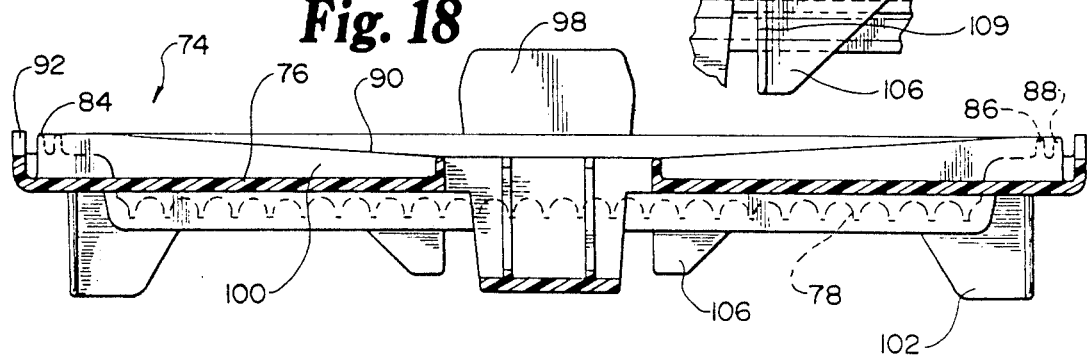

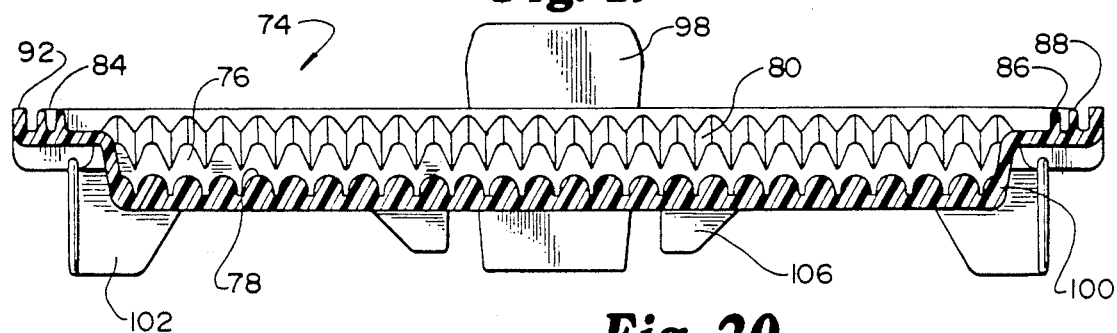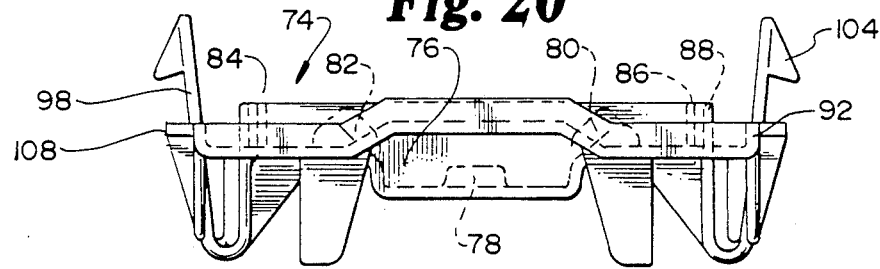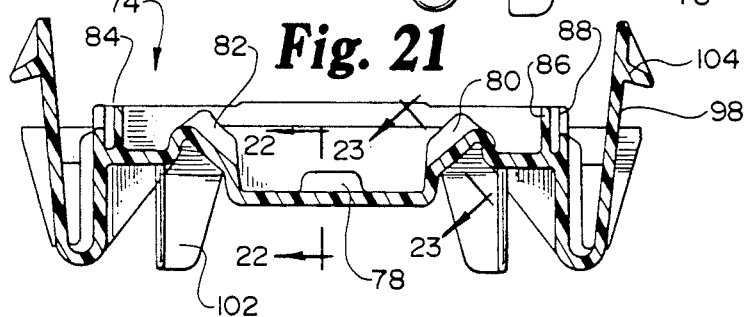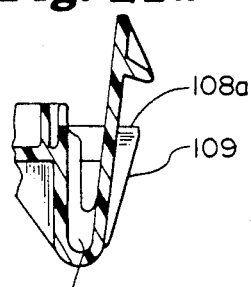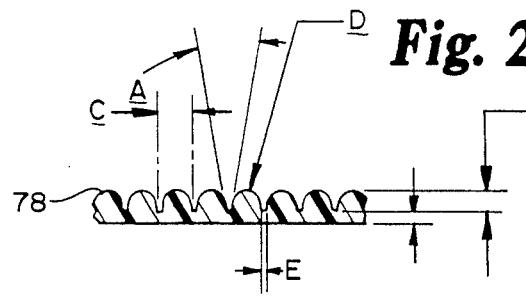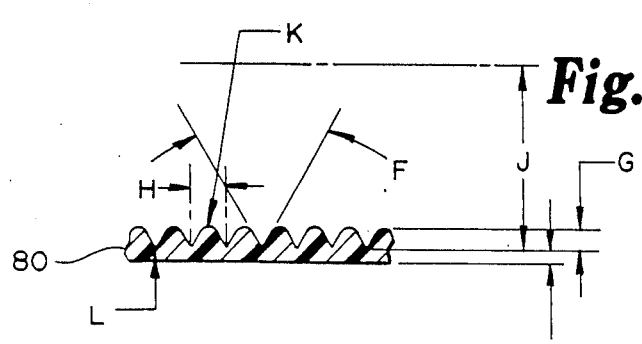

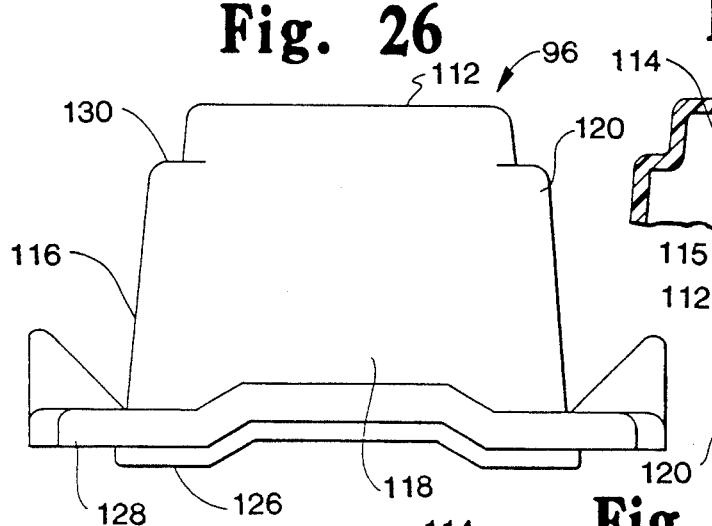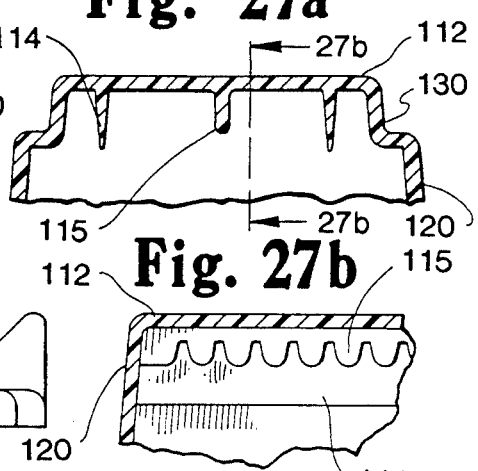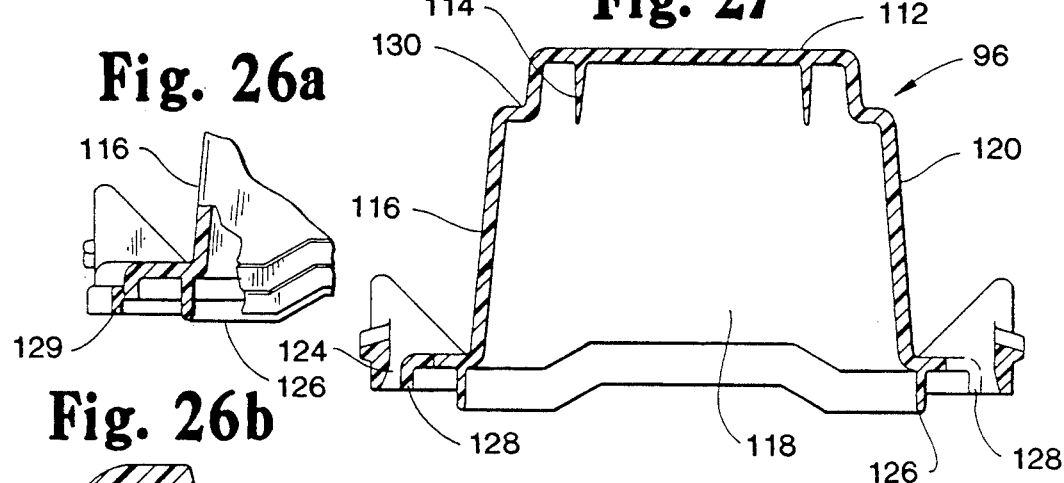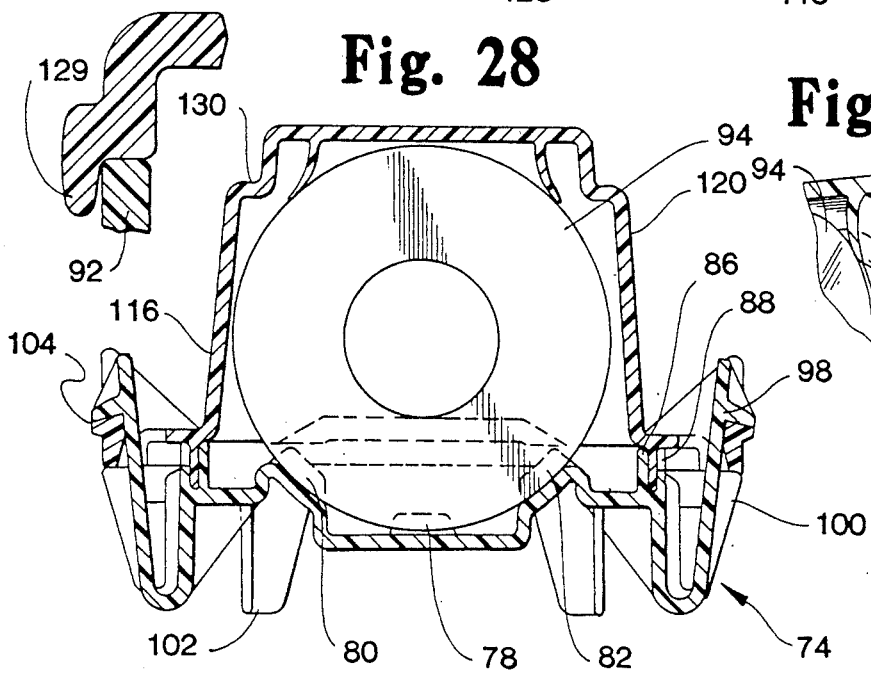

DISK SHIPPER

Cross-Reference to Related Application

This application is a continuation-in-part of co-pending application Ser. No. 332,038, filed Apr. 3, 1989.

BACKGROUND OF THE INVENTION

1. Field of the Invention

This invention relates to novel disk shippers for secure handling, transportation and storage of relatively rigid information storage memory disks. The disk shippers are designed so that, with the cover removed, the disks are supported within the shipper bottom in an axial alignment accessible to both internal and external diameter handling. The present shipper bottoms are each compatible with an existing internal diameter access disk process carrier, to permit transfer of disks from shipper bottom to carrier or vice versa in a simple non-rolling transfer operation In addition to the first disk shipper disclosed in Ser. No. 332,038, this application discloses an alternative disk shipper having certain improvements in structure and function over those described and claimed in Ser No. 332,038, especially in the area of the disk retaining members in the cover, in the disk bed in the bottom, in the latch and in the labyrinth seal of the shipper unit.

The majority of existing memory disk shippers are typically designed to permit only internal diameter disk handling. Newly developed manual and automated disk manipulative techniques utilize either or both external or internal diameter disk handling and the present disk shippers are thus designed to be compatible therewith. The present disk shippers are further designed to permit loading, unloading, latching and unlatching entirely by robotic manipulative techniques, eliminating the need for costly and potentially damaging manual handling.

As mentioned above, another unique feature of the present novel shippers is the ability to transfer disks from the disk shipper bottom to the compatibly designed disk carrier and vice versa, while maintaining the disks securely held throughout the transfer procedure, avoiding undesirable rolling of the disks. Any such rolling in disk transfer operations, referred to as "dumping", generates particulate, a potential source of damage to the disks. Since the disk carrier, with which the Present disk shippers are transfer compatille, does not allow for external diameter handling of the disks, this transfer procedure allows the disks to be transposed from the carrier to the shipper bottom in an axial alignment permitting either internal or external diameter disk handling.

The type of disks intended to be used with the disk shippers and carrier of this invention are relatively rigid information storage disks, such as optical disks, aluminum computer disks, compact disks and computer memory storage disks. A particular embodiment of this invention is especially suited to new smaller sized and relatively thick 65 mm information storage disks. Although the disk shippers of this invention and the compatitly designed carrier may be modified for use with information storage disks of other diameter and thickness dimensions and with more fragile wafers, such as silicon wafers, they are primarily designed for use with more relatively rigid and break resistant information storage disks. Furthermore, the present shipper packages are further designed to be of minimum overall dimensions, reducing the amount of empty space, enabling efficient and economical space utilization when a multiplicity of like packages are stacked together or when empty components are nested together.

2. Description of the Related Information

Currently available disk shippers and carriers which allow for both internal and external disk handling are not necessarily compatible with exclusively robotic handling. Thus, the disk shippers and carriers described in commonly assigned U.S. Pat. No. 4,718,552 and 4,752,007 require at least some manual intervention, at least in regard to latching and unlatching of the disk shipper package.

Also, disk shippers described in co-pending, commonly assigned Ser. No. 163,981, filed Mar. 4, 1988 and Ser. No. 196,734, filed May 20, 1988 are designed for total robotic handling, but do not present the disks in a configuration for both ID and OD accessibility. The disk shippers described by these two co-pending applications require an interior disk-containing carrier, thus entailing a three-component disk shipper.

In addition, the presently designed disk shipper packages utilize a more space-economical design than is found with any of these previously available packages by streamlining and eliminating much of the empty space within the package. With current transportation and storage costs, the ability to safely and securely contain a larger number of disk shipper packages in a given space, without sacrifice of security and safety for the disks is an extremely important consideration.

SUMMARY OF THE INVENTION

The first embodiment of the disk shipper according to this invention described in Ser. No. 332,038 consists of a first shipper bottom and a first shipper cover which mates with the first bottom in latching attachment. The first shipper bottom includes a generally rectangular floor member having a disk bed which comprises a plurality of arcuate disk engaging and supporting grooves curved to the disk peripheral contour to engage and support the disks in upright parallel spaced-apart axial alignment. The disks, which the present disk shippers are designed to support, optimally contain a central hole which is concentric with the disk circumference. The disk bed of the first shipper bottom is substantially surrounded by one part of a two part continuous seal. One part of a two part latch means is provided on each of two opposite sides of the first shipper bottom. The disk bed, the seal and the latch are configured so that the disks are accessible to internal diameter handling of disks having a central hole and to external diameter handling of disks substantially below the disk horizontal centerline. The first shipper bottom may further be provided with a cover positioning member extending upwards from the floor perimeter, the cover positioning member also configured so that the disks are accessible to internal diameter handling of disks having a central hole and to external diameter handling of disks substantially below the disk horizontal centerline.

The first shipper cover as described in Ser. No. 332,038 includes a generally rectangular top member having at least a parallel pair of rows of downwardly extending dentate leaves in cooperating alignment with the disk supporting grooves in the disk bed in the shipper bottom. When the first cover is mated with the first bottom, the dentate leaves in the first cover cooperate with the disk bed in the first bottom to maintain and support the disks in upright parallel spaced-apart axial alignment. Four side walls are angled downwardly and slightly outwardly from the top member in minimum non-contact with the peripheral contour of the disks. The walls terminate in part two of a two part continuous seal which substantially surrounds the perimeter of the four sides in cooperating alignment with part one of the seal on the first bottom. Part two of a two part latch means is provided on each of two opposite walls of the first cover in cooperating alignment with one part of a two part latch means on the first bottom. The first cover may further be provided with a bottom positioning member extending downward from the walls of the first cover in cooperating alignment with the cover positioning member extending upwards from the floor perimeter of the first bottom.

The alternative disk shipper according to the additional disclosure of the present application consists of an alternative shipper bottom end an alternative shipper cover which mates with the alternative bottom in latching attachment. The alternative shipper bottom includes a generally rectangular floor member having a disk bed which comprises a set of three disk supporting longitudinally parallel denticulate rows of bumps to cooperatingly provide three arcuate Points of support for each disk to maintain the disks in upright lateral parallel spaced-apart axial alignment. The disks, which the alternative disk shipper is designed to support, optimally contain a central hole which is concentric with the disk circumference. The disk bed is substantially surrounded by a first part one of a first two part continuous seal. One part cf a two part latch means is provided on each of two opposite sides of the alternative shipper bottom. The disk bed, the seal and the latch are configured so that the disks are accessible to internal diameter handling of disks having a central hole and to external diameter handling of disks substantially below the disk horizontal centerline. The alternative shipper bottom is further provided with a cover positioning member extending upwards from the floor perimeter, the cover positioning member also configured so that the disks are accessible to internal diameter handling of disks having a central hole and to external diameter handling of disks substantially below the disk horizontal centerline.

The alternative shipper cover includes a generally rectangular top member having at least a longitudinal parallel pair of rows of downwardly extending resilient flanges in cooperating alignment with the serrated rows in the disk bed in the alternative shipper bottom. Between the flanges, also extending downwardly from the top member is a longitudinal row of crenate scallops. The resilient flanges, and the crenate scallops cooperatingly provide three arcuate points of support for each disk when the alternative shipper cover and bottom are latched together, to maintain the disks in upright parallel spaced-apart axial alignment. When the alternative cover is mated with the alternative bottom, the resilient flanges and crenate scallops in the cover cooperate with the denticulate rows of bumps in the bottom to maintain and support the disks in upright parallel spaced-apart axial alignment. Four side walls are angled downwardly and slightly outwardly from the top member in minimum non-contact with the peripheral contour of the disks. The walls terminate in part two of a two part continuous seal which substantially surrounds the perimeter of the four sides in cooperating alignment with part one of the seal on the alternative bottom. Part two of a two part latch means is provided on each of two opposite walls of the alternative cover in cooperating alignment with one part of a two part latch means on the alternative bottom. The alternative cover is further provided with a bottom Positioning member extending downward from the walls of the cover in cooperating alignment with the cover positioning member extending upwards from the floor perimeter of the alternative bottom. The bottom positioning member can form part two of a second two part continuous seal at the outside perimeter of the alternative cover, in cooperation with the cover positioning member as part one of this second two part continuous seal.

The disk shippers of this invention allow the disks to be handled manually or through automation by either the internal or external diameter in loading and unloading disks into the shipper bottoms, as well as in latching and unlatching the cover to the bottom.

Another unique feature of the disk shippers of this invention is the ability to transfer the disks from either shipper bottom to an existing compatibly designed internal diameter access disk carrier and vice verse in a manual operation without rolling of the disks. The existing internal diameter access disk carriers with which the shipper bottoms of the present disk shippers are designed to be transfer compatible are generally of the type as described in U.S. Pat. No. 4,718,552 and U.S. Pat. No. 4,752,007, and are available from Fluoroware, Inc., Minnesota, and from Empak, Inc., Minnesota.

The disk shippers have a smooth exterior that permits a heat shrinkable plastic package to be formed around the shipping container if desired and purged with an inert gas to provide additional structural integrity to the shipper and to provide additional protection against environmental contamination.

The assembled shipper packages of each design are securely stackable with other packages of the same design, the shipper bottoms and covers are individually nestable for economy of space, with minimum non-contact of bottom and cover interiors, respectively. The shipper bottoms and covers are designed to permit minimum non-contact with the disk contents in areas other than those specifically designed to support the disks.

It is to be understood that the cover and bottom of the first shipper described and claimed in Ser. No. 332,038 interengage only with each other. Also, the alternative cover and alternative bottom of the alternative shipper newly described and claimed in this application interengage only with each other.

Since the disk shippers of this invention are intended to provide safe and secure packaging for transportation by common carrier, a package loaded with relatively rigid information storage disks is designed to withstand normal handling with the disks remaining intact and undamaged.

BRIEF DESCRIPTION OF THE DRAWINGS

The following drawings illustrate the many advantages of the present invention, with like reference numbers referring to like parts throughout.

FIG. 1a is a fragmentary perspective detail view of part of a first disk bottom latch taken from area encircled at 1a in FIG. 1;

FIG. 2 is an exploded end elevation view of a first shipper assembly with disks shown in Phantom dashed line and parts cut away;

FIG. 5 is a sectional elevation taken along line 5—5 in FIG. 4;

FIG. 5a is an enlarged fragmentary perspective detail taken from area encircled at 5a in FIG. 5;

FIG. 7 is a side elevational view of an inverted first shipper bottom resting on a disk carrier filled with disks;

FIG. 8 is an end elevational view of the subject of FIG. 7;

FIG. 9 is an end elevational view of the subject of FIGS. 7 and 8 showing the carrier, a first shipper bottom and disks inverted;

FIG. 10 is a side elevational view of nested first shipper covers with parts cut away;

FIG. 11 is an end elevational view of the subject of FIG. 10 with parts cut away;

FIG. 12 is a side elevational view of nested first shipper bottoms;

FIG. 13 is an end elevational view of the subject of FIG. 12;

FIG. 14 is a side elevational view of stacked first shippers, and;

FIG. 15 is an end elevational view of the subject of FIG. 14.

FIG. 16 is a top plan view of the bottom of the alternative memory disk carrier newly described in this application.

FIG. 16a is a fragmentary top plan view of an alternate form from the at of FIG. 16.

FIG. 17 is a front elevational view of the bottom of FIG. 16.

FIG. 17a is a fragmentary top plan view of an alternate form from that of FIG. 17.

FIG. 18 is a sectional elevation taken along line 18—18 in FIG. 16.

FIG. 19 is a sectional elevation taken along line 19—19 in FIG. 16.

FIG. 20 is an end elevational view of the alternate form bottom.

FIG. 21 is a sectional elevation taken along line 21—21 of FIG. 16.

FIG. 21a is a fragmentary sectional detail view of an alternate form from that of FIG. 21.

FIG. 22 is an auxiliary detail section taken along line 22—22 in FIG. 21.

FIG. 23 is an auxiliary detail section taken along line 23—23 in FIG. 21.

FIG. 26 is an end elevational view of the alternative cover.

FIG. 26a is a fragmentary elevational view of an alternate form from that of FIG. 26 with parts cut away.

FIG. 26b is a greatly enlarged detail of the alternate form of FIG. 26a shown in assembly.

FIG. 27 is a sectional elevation taken along line 27—27 in FIG. 24.

FIG. 27a is a fragmentary sectional detail view of an alternate form from that of FIG. 27.

FIG. 27b is a fragmentary sectional view taken along line 27b-27b of FIG. 27a.

FIG. 28 is a sectional elevation combining the sectional elevations of FIGS. 21 and 27 in assembly with disk element.

FIG. 29 is a fragmentary perspective view taken from the area encircled at 29 in FIG. 28.

DETAILED DESCRIPTION OF THE INVENTION

Figure 1:
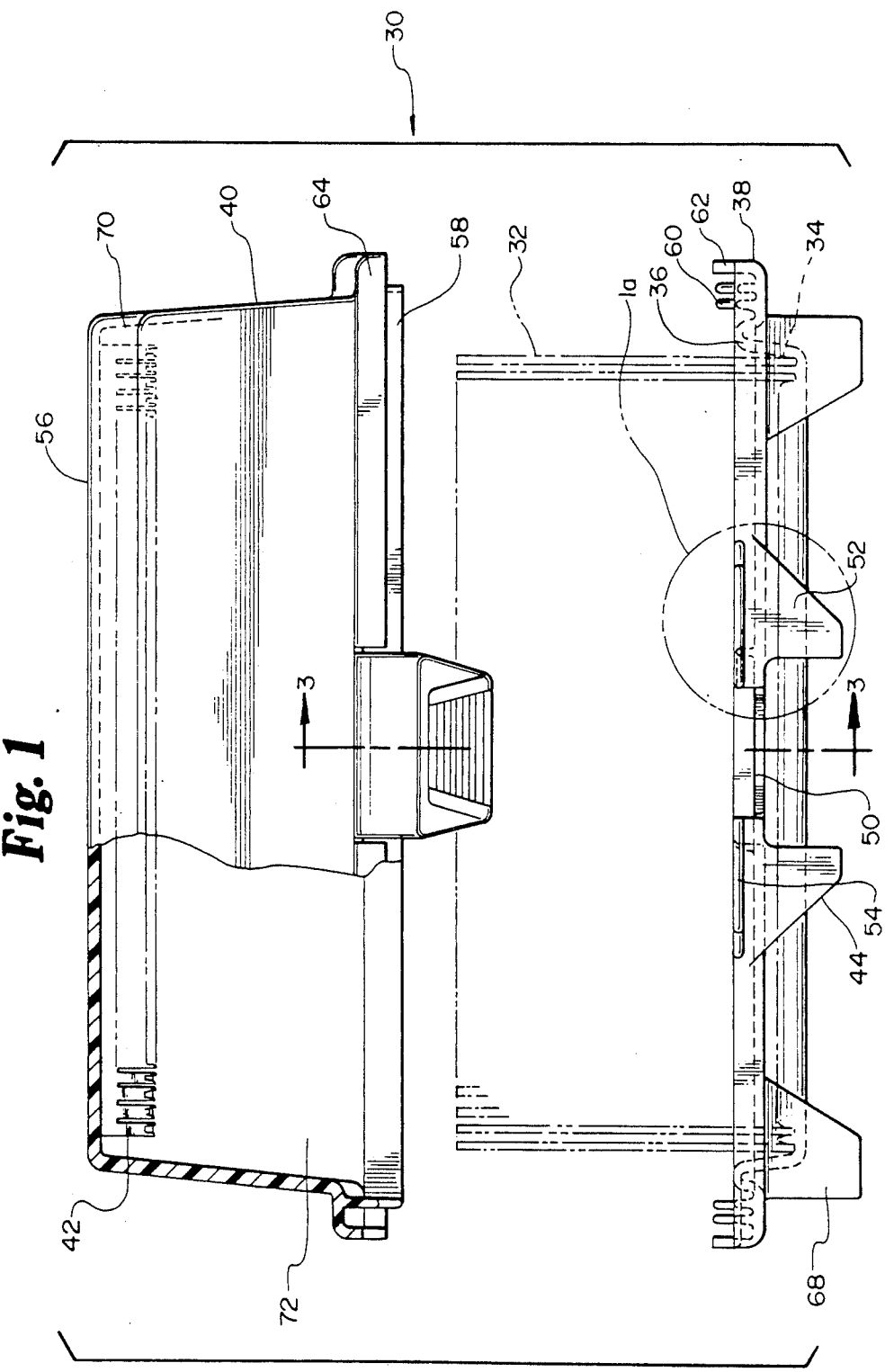
FIG. 1 is an exploded side elevational view of a first shipper assembly with disks shown in phantom dashed line and parts cut away.

FIG. 1 illustrates the first disk shipper 30 containing a plurality of disks 32 resting in upright parallel spaced-apart axial alignment within respective grooves 34 in the disk bed 36 of the first shipper bottom 38. The first shipper cover 40 is suspended over the first shipper bottom 38 preparatory to being lowered into a latching engagement with the first shipper bottom 38, the first shipper cover 40 having a parallel pair of mirror image rows of downwardly extending dentate leaves 42 in cooperating alignment with the grooves 34 in the disk bed 36 in the first shipper bottom 38. With the first shipper cover 40 removed, the first shipper bottom 38 allows access to the external diameter of the disks 32 substantially below the horizontal centerline of the disk. Thus, the design of the first shipper bottom is compatible with both ID and OD disk handling.

Figure 3:
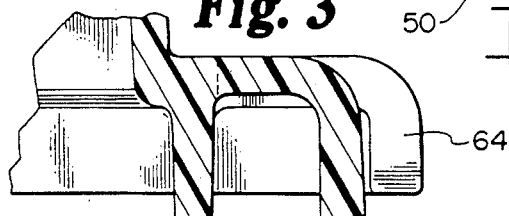
FIG. 3 is an enlarged fragmentary sectional detail taken along line 3—3 in FIG. 1, showing parts partially assembled.

FIG. 1a is a fragmentary detail view of Part of the first shipper bottom 38 latch means 44 taken from the area encircled at la in FIG. 1. FIG. 2 is an exploded end elevation view of the first disk shipper assembly 30, with the first shipper cover 40 suspended over the first shipper bottom 38 preparatory to being lowered into latching engagement with the disks 32 shown in phantom dashed line and parts cut away. FIG. 3 is an enlarged fragmentary sectional detail taken along line 3—3 in FIG. 1, showing the cover latch means 46 and the bottom latch means 44 partially assembled.

Figure 4:
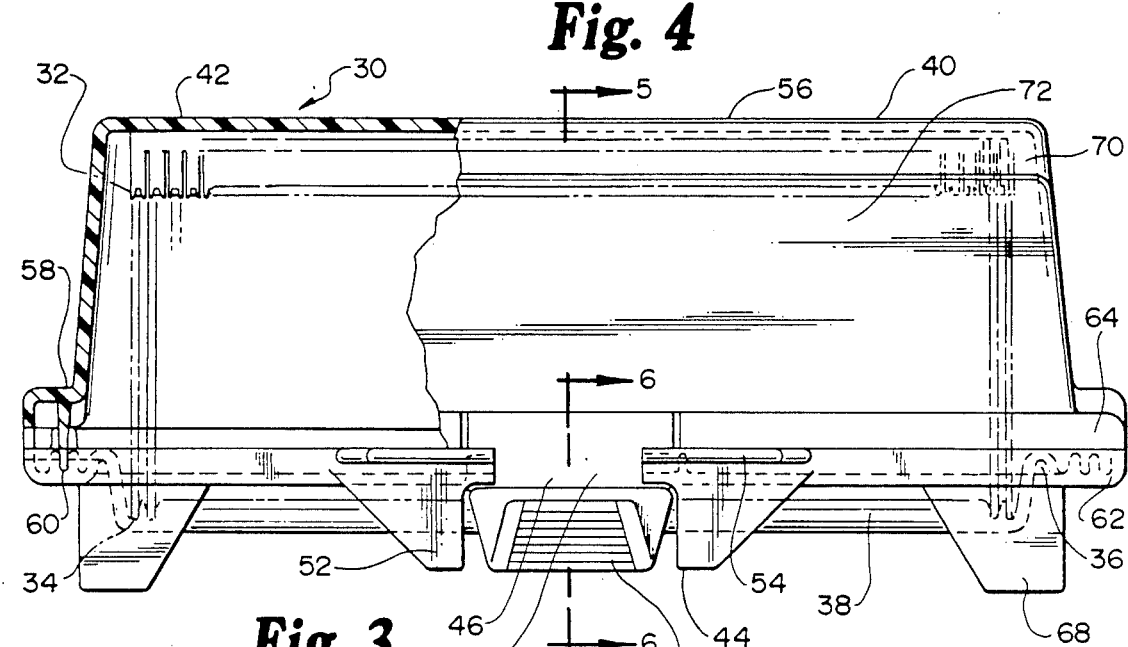
FIG. 4 is a side elevational view of assembled first shipper with parts cut away.
Figure 6:
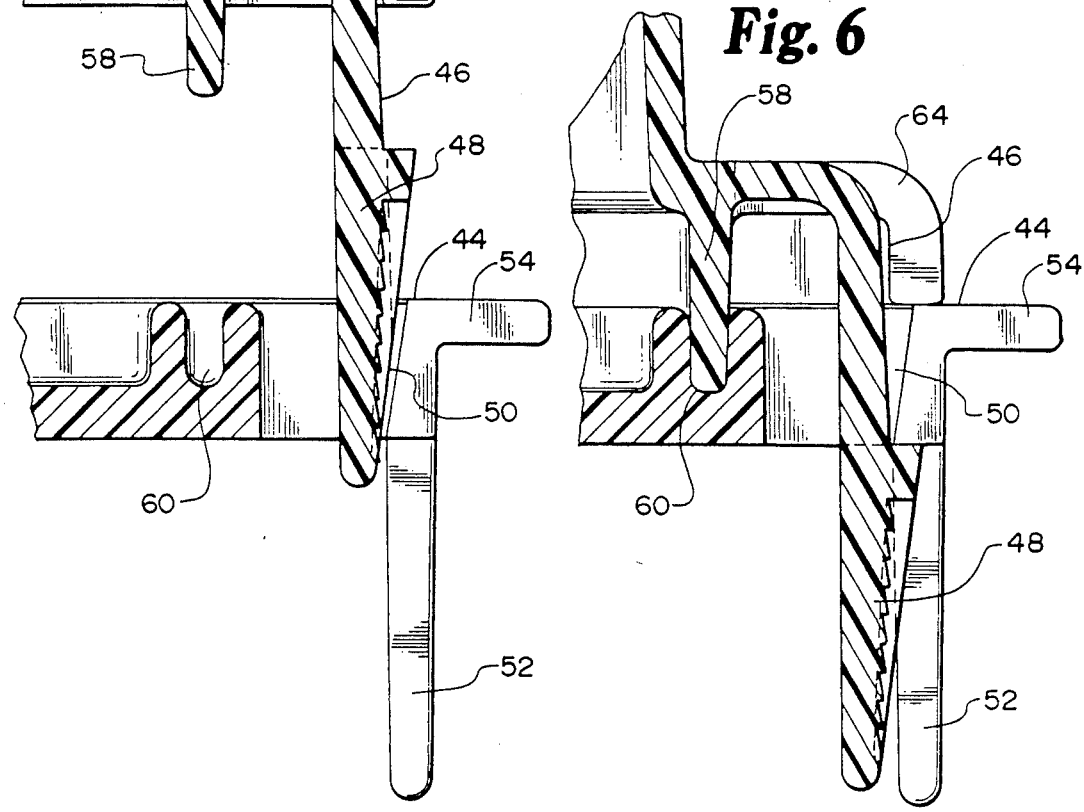
FIG. 6 is an enlarged fragmentary sectional elevation taken along line 6—6 in FIG. 4.

FIGS. 4 and 5 illustrate the first disk shipper 30 assembly with the first shipper cover 40 in latched engagement with the first shipper bottom 38. FIG. 4 is a side elevational view of the assembled first shipper 30 with parts cut away. FIG. 5 is a sectional elevation taken along line 5—5 in FIG. 4. In latching the first shipper cover 40 to the first shipper bottom 38, the latch tang 48 on the first cover 40 is guided through the exteriorly open tang-receiving slot 50 and is held firmly in place with a slight biasing action. The exteriorly open slot 50 permits constant contact with the tang 48 during engaging and disengaging the latch. The tang receiving slot 50 is further made with an integrally formed skirt 52 and a laterally projecting tab, both designed to protect the engaged tang 48 from accidental disengagement. FIG. 6 is an enlarged fragmentary sectional elevation taken along 6—6 in FIG. 4, showing the first shipper bottom and first cover in latched attachment. The grooves 34 in the disk bed 36 in the first shipper bottom 38 below and the downwardly extending dentate leaves 42 in the first shipper cover 40 above cooperate to maintain the disks 32 in upright parallel spaced apart alignment and provide secure cushioning of the disks 32 to prevent transverse or lateral motion within the latched first shipper 30. The parallel pair of mirror image rows of downwardly extending dentate leaves 42 are molded into the top 56 of the first shipper cover 40. FIG. 5a is an enlarged fragmentary perspective detail taken from the area encircled at 5a in FIG. 5 showing the dentate leaves 42. When latched, the two parts of the continuous seal 58, 60 mate to form a dust-proof seal for the shipper contents. The cover and bottom positioning members 62, 64 further cooperate form a second dust barrier.

In operation, a plurality of disks 32 are loaded into the grooves 34 in the disk bed 36 of the first bottom 38. The loading operation may be performed by any manual or preferably autonated procedure. Advantageously, the first shipper bottom 38 is designed to accept non-rolling transfer of disks 32 from a compatibly designed disk carrier 66, as defined herein above and in U.S. Pat. No. 4,718,552 and 4,752,007. A typical transfer compatible disk carrier 66 is illustrated in FIGS. 7, 8 and 9 in assembly with the first shipper bottom 38 of the first disk shipper 30 of this invention. Note that the compatibly designed disk carrier 66 allows access to the disks 32 only by their internal diameter.

To accomplish the manual non-rolling transfer of the disks 32 from a compatibly designed disk carrier 66 to the first shipper bottom 38, the inverted first shipper bottom 38 is lowered into Position over the upright disk carrier 66 so that the grooves 34 in the disk bed 36 in the first shipper bottom 38 engage the disks 32 held by the carrier 66, as illustrated in FIGS. 7 and 8. By firmly holding the first shipper bottom 38 and the disk carrier 66 assembly in cooperating alignment, the first shipper bottom and the disk carrier assembly is carefully inverted to the position as shown in FIG. 9. so that the disks 32 are now resting on the first shipper bottom 38. The cooperating alignment of the grooves 34 of the first shipper bottom 38 with the disks 32 held by the disk carrier 66 is such that the inversion is accomplished without rolling or dropping of the disks. The disk carrier 66 is then carefully lifted up and away from the disks 32, leaving the disks firmly supported by the grooves 34 of the first shipper bottom 38 in upright parallel spaced-apart axial alignment. The low profile of the first shipper bottom 38 permits free access to the disks 32 substantially below their horizontal centerline, so that the disks are now accessible by either ID or OD handling. No more than 30% of the area of the disk is obscured by the grooves 34 of the first shipper bottom 38. This transfer procedure also positions the disks 32 in the first shipper bottom 38 in proper alignment for latching attachment of the first shipper cover 40. In transferring the disks from the shipper bottom 38 to a transfer compatible disk carrier 66, the above procedures are reversed in order.

To latch the first shipper cover 40 to the first shipper bottom 38, the first cover 40 is lowered into position over the first bottom 38 so that the latch tang 48 in the first cover 40 enters the exteriorly open tang-receiving slot 50 in the first shipper bottom 38. The first shipper cover 40 is firmly but gently pressed down over the first shipper bottom 38 so that the dentate leaves 42 in the first cover 40 engage the disks 32 held by the first shipper bottom 38, as illustrated in FIGS. 3, 4, 5 and 6. When the first shipper 30 is firmly latched, there is a slight biasing of the dentate leaves 42 of the first cover 40 against the disks 32 which serves to further stabilize the disks against relative movement. Removal of the first shipper cover 40 is accomplished by inward pressure on each tang 48, sliding upwards through the exteriorly open tang-receiving slot 50. The first shipper cover 40 will then "pop up" slightly, due to the release of the slightly biasing spring action of the dentate leaves 42. When the present novel shipper is dimensioned for supporting 65mm disks of 25 disk capacity, the cover 40 is of sufficient width and height that a normal sized hand can simultaneously actuate both latches 46, thus allowing single-handed engagement and removal of cover 40 from bottom 38. The first disk shipper 30 has a smooth exterior that permits a heat shrinkable plastic package to be formed around the shipping container if desired and purged with an inert gas to provide additional structural integrity to the shipper and additional Protection against environmental contamination.

FIG. 16 illustrates a top plan view looking down into the interior of the alternative disk shipper bottom 74, illustrating the disk bed 76 with the set of three disk supporting longitudinally Parallel denticulate rows of raised ridges, a central row 78 and two side rows 80 and 82. The three rows 78, 80 and 82 cooperatingly provide three arcuate Points of support for each disk to maintain the disks in upright lateral parallel spaced-apart axial alignment. The disk bed 76 is substantially surrounded by part one 84 of a two part continuous seal. Part one 84 of the continuous seal is a pair of parallel lips 86 and 88 of substantially even height throughout, with the exterior lip 88 formed with a gradual downward taper 90 in the latch area, as seen in FIGS. 17 and 18. The alternative shipper bottom 74 is further provided with a cover positioning rim 92 extending upwards from the floor Perimeter, to provide proper alignment and positioning with the alternative cover, as will be further described herein. As shown in FIGS. 16 through 21, the alternative shipper bottom 74 is configured to allow access to the internal diameter handling of disks having a central hole and to external diameter handling of disks with or without a central hole substantially below the disk horizontal centerline.

As illustrated in FIGS. 16 and 19 through 21, the three dentate rows of raised ridges 80 and 82 of the disk bed 76 are arranged to provide two points of arcuate support for the perimeter of each disk. In the following description, specific dimensions given are for a typical disk shipper of this invention designed for supporting disks of approximately 65 mm diameter and nominally 0.030-0.050 inch thickness, with a total capacity of 25 disks. The central row of raised ridges 78 are positioned to provide lateral stability to prevent the disk form rocking out of the normally resting position. This central row of ridges 78 is not normally in contact with the disk except when the shipper bottom, loaded with disk(s) and without the shipper cover attached, is tipped such that a short end of the shipper bottom is dropped in elevation as compared to the opposite short end, or when oscillated end to end. As best illustrated in FIG. 22, the profile of each of the ridges of the central row 78 is generally semi-circular. The central row is shaped to have a relatively narrow pocket angle A in a range of approximately 0° to 40°. The angle A is chosen which will act as a stop to prevent the disk from rocking out of the normally resting position when the shipper bottom is tipped as mentioned earlier. Preferably, the pocket angle A is approximately 20°.

The ridge height B is chosen to be of sufficient height as to provide the disk edge an adequate pocket angle surface to contact. The range of ridge height B is generally from approximately 0.080 to 0.250 inch, preferably bout 0.150 inch.

The disk spacing C of the central row of ridges 78 is chosen to be identical to the disk spacing of the side rows of ridges 80 and 82. The ridge top radius Q is formed by an arc which is tangent to the corresponding two adjacent pocket angled surfaces and also tangent to a theoretical line to the top of all ridges 78 thus providing a full radius which determines ridge height B and a smooth uninterrupted ridge surface. Ridge top radius D value is a result of pocket angle A and ridge height B selected. The range for dimensions of the ridge top radius D would be 0.00 to 0.12 inch, preferably 0.098 inch.

The pocket flat E dimension should be large enough as to not allow the pocket angle A surfaces to touch or bind the disk edges while the disk is in normally resting position. However, the pocket flat E dimension should not be excessively wide as to allow the disk to wobble considerably when the shipper bottom is loaded with disks and oscillated end to end or the ends tipped up or down. The pocket flat E dimension is chosen according the the thickness of the disk to be supported and the pocket angle A chosen. A range for the pocket flat E dimension should be between about 0.000 to 0.050 inch, Preferably 0.034 inch.

As best illustrated in FIG. 23, the profile of each of the ridges of the side rows 80 and 82 is generally semi-oval. The side rows of ridges 80 and 82 are shaped to have a relatively wide pocket angle F, in the range of 40° to 90° included, preferably 60°. The pocket angle F is determined by choosing the minimum included angle that will not contact the face of the disk when inserting or removing the disk. The ridge height G is of sufficient height as to prevent disks from easily jumping into their adjacent pockets, and should generally be in the range of 0.080 to 0.250 inch in height, preferably 0.150 inch.

Disk spacing C and H is a result of the quantity of disks to be supported in a given length. The range for spacing of disks should be between about 0.125 to 0.375 inch for economical shipment of multiple disks, preferably 0.250 for a shipper with a 25 disk capacity.

The nominal part wall curvature J is determined by the radius of the disk supported in addition to any offset distance that the inside nominal part wall J is held away from the disk edge. The offset distance would be in a range of between about 0.00 to 0.125 inch, preferably 0.013 inch.

The ridge top radius K is formed by an arc which is tangent to the corresponding two sides of adjacent pocket angle F surfaces and also tangent to a theoretical line to the top of all ridges 80, 82, thus providing a full radius which determines ridge height G and a smooth uninterrupted ridge surface. Ridge top radius K is a result of pocket angle F and ridge height G selected in supporting the disk. The range for dimensions of the ridge top radius K should be between about 0.00 to 0.14 inch, preferably 0.056 inch.

The pocket radius L is to be only as large as to provide a smooth uninterrupted connection of the two pocket angle F surfaces to the inside nominal Part wall J. normally in a range of between about 0.005 to 0.030 inch, depending on the thickness of the disk to be supported, preferably about 0.010 inch.

As illustrated in FIG. 28, the disk 94 is contacted between the upper parts of adjacent ridges on the central row 78 and the disks are contacted by the lower parts of adjacent ridges on the side rows 80 and 82.

As shown in FIGS. 16 through 21 and 28, the alternative bottom 74 and the alternative cover 96 are engaged together by a pair of two part latches. On the alternative bottom 74, a part one of the latch is positioned in the center of each of the two longitudinal sides 100. Part one of the latch is a U-shaped tab 98, the base of which is coextensive with the four bottom supporting feet 102 positioned at each corner of the alternative bottom 74.

The U-shaped tab 98 terminates in an upstanding catch 104 higher than the bottom perimeter. The manner of latching to the alternative cover will be described in detail further herein. The alternative bottom 74 is further provided with a pair of downwarding extending skirts 106 on either side of each U-shaped tab 98 and a pair of outwardly extending ears 108 on either side of each U-shaped tab 98. The skirts 106 and ears 108 are designed to protect the engaged tab 98 from accidental disengagement. As shown in FIGS. 16a and 17a, the alternative latch protecting ears 108a may extend a shorter distance sideways of the latch tab 98 and the latch protecting skirt 106 may be formed with a reinforcing rib 109 extending from the latch Protecting ear 108a to the base of the latch protecting skirt 106. Further, as shown in FIG. 21a, the U-shaped latch tab 98 may further be formed with a reinforcing rib 99 within the U-shaped interior of tab 98.

Figure 24:
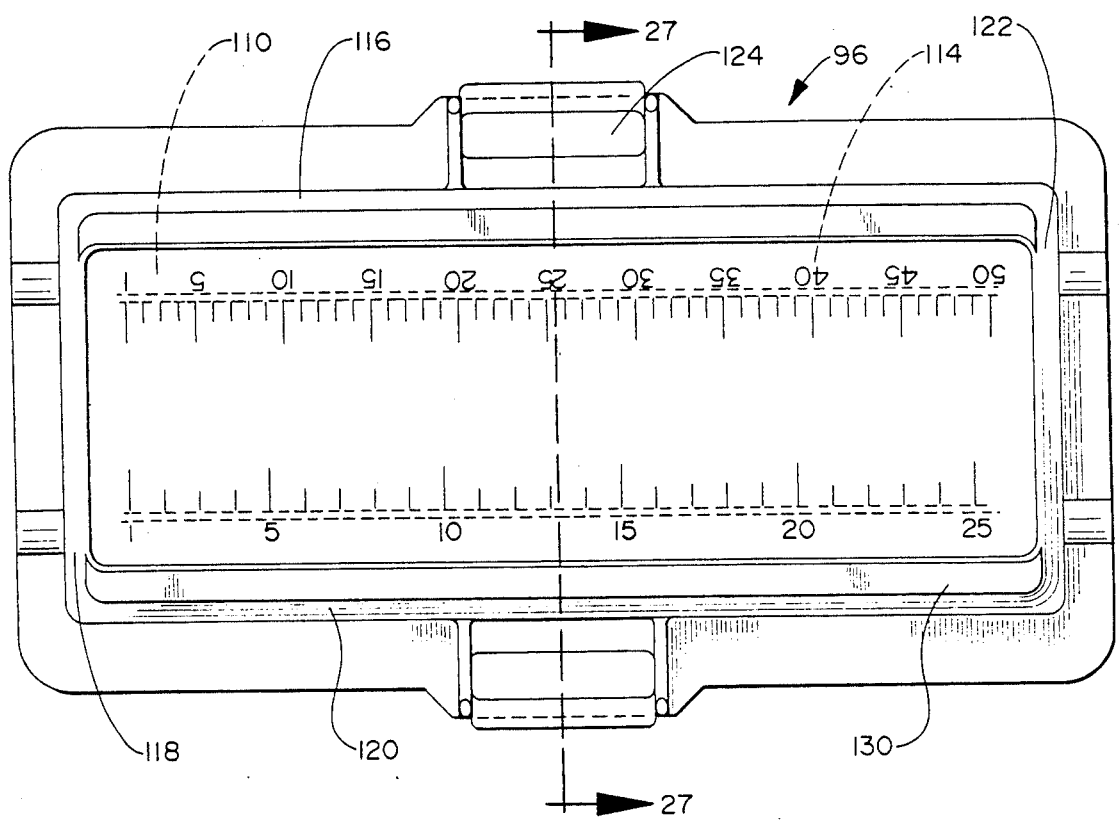
FIG. 24 is a top plan view of the cover of the alternative memory disk carrier newly described in this application.
Figure 25:
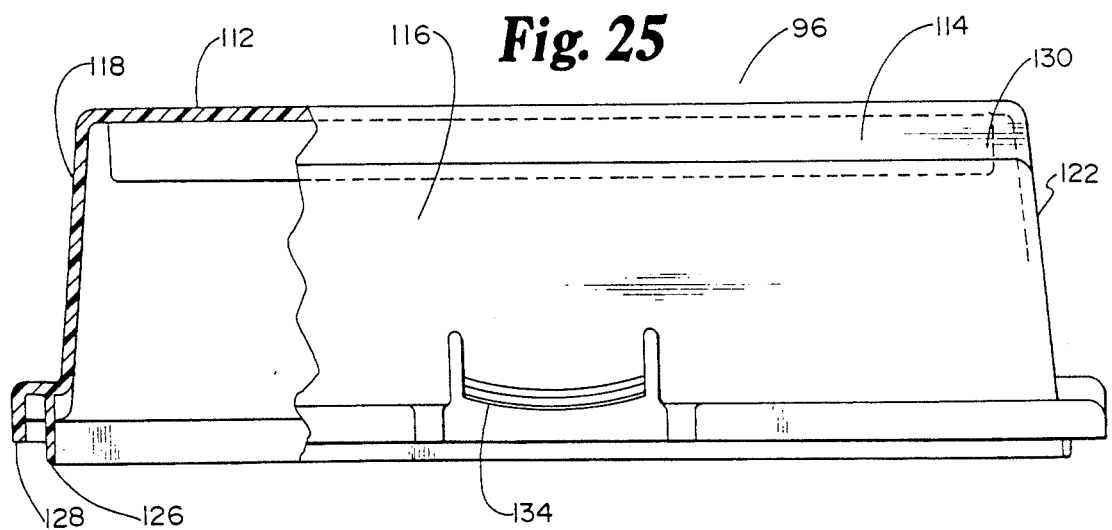
FIG. 25 is a from elevational view of the alternative cover with parts broken away.

FIG. 24 is a top plan view of the cover 96 of the alternative memory disk shipper 110 of the Present invention, looking down on the cover exterior. The alternative cover 96 has a generally rectangular top 112 having a longitudinal Parallel pair of downwardly extending resilient flanges 114. Preferably, a longitudinal row of crenate scallops 115 is positioned intermediate the flanges 114, also in cooperating alignment with the dentate rows 78, 80 and 82 in the shipper bottom 74. The central position and the profile of the row of crenate scallops 115 is illustrated in FIGS. 27a and 27b. The flanges and the scallops are in cooperating alignment with the dentate rows of raised ridges 78, 80 and 82 in the disk bed in the alternative shipper bottom 74 for maintaining the disks 94 in upright lateral parallel spaced-apart axial alignment Four side walls 116, 118, 120 and 122 are angled downwardly and slightly outwardly from the top 112. The top 112 and side walls 116, 118, 120 and 122 of the alternative cover are designed to provide minimum non-contact with the peripheral contour of the disks 94. In the center of lower edge of each of the two longitudinal sides 116 and 120 is part two of a two part latch, a catch receiving window 124, in cooperating alignment with part one 98 of a two part latch means on the alternative bottom 74. The walls 116, 118, 120 and 122 of the shipper cover 96 terminate in a lip 126, part two of a two Part continuous seal, substantially surrounding the perimeter of the four walls 116, 118, 120 and 122, in cooperating alignment with part one 84 of the seal on the alternative bottom 74, to provide a continuous seal of the alternative cover 96 with the alternative bottom 74. Extending downward from the perimeter of the walls 116, 118, 120 and 122 of the alternative cover 96, exterior to the seal lip 126, is a bottom Positioning rim 128 in cooperating alignment with a cover positioning rim 92 on the alternative bottom 74. Preferably, the bottom positioning rim may be formed as a continuous seal rim 129, as shown in FIG. 26a, to overlap the cover positioning rim 92 as shown in FIG. 26b, this forming a second continuous seal of the alternative cover 96 with the alternative bottom 74, providing further protection of the disk contents.

FIG. 28 is an end elevation view of the alternative disk shipper assembly 110, with the alternative shipper cover 96 over the alternative shipper bottom 74 lowered into latching engagement with disks 96 shown in phantom dashed line and parts cut away.

In latching the alternative shipper cover 96 to the shipper bottom 74, the catch 104 on the U-shaped tab 98 of part one of the latch is guided through the catch receiving window 124 on the alternative cover 96 and is held firmly in place with a slight biasing action. The alternative bottom adjacent the U-shaped tab 98 is formed with a pair of downwardly extending skirts 106 an a pair of outwardly extending ears 108 or 108a, preferably reinforced with the rib 109, both designed to protect the engaged latch from accidental disengagement. In the assembled alternative shipper 110, as shown in FIG. 28, the denticulatd rows 78, 80 and 82 in the shipper bottom 74 below and the downwardly extending resilient flanges 114 and preferably the row of crenate scallops 115 in the alternative shipper cover 96 above cooperate to maintain the disks 94 in upright parallel spaced apart alignment and provide secure cushioning of the disks 94 to prevent transverse or lateral motion within the latched alternative shipper 110. The parallel pair of resilient flanges 114 and the row of crenate scallops 115 are molded into the top 112 of the shipper cover 96. The resilient engagement of the flanges 114 with the disks 94 in the latched alternative shipper 110 is illustrated in FIG. 29. When latched, the two Parts of the first continuous seal 84, 126 mate to form a dust-proof seal for the shipper contents. The cover and bottom positioning members 92, 128 or 129 further cooperate to form a second dust barrier.

In operation, a plurality of disks 94 are loaded into the denticulated rows 78, 80 and 82 in the alternative shipper bottom 74. The loading operation may be performed by a manual or preferably automated procedure. Advantageously, the alternative shipper bottom 74 is designed to accept non-rolling transfer of disks 94 from a compatibly designed disk carrier 66, as defined herein above and in U.S. Pat. No. 4,718,552 and 4,752,007. A typical transfer compatible disk carrier 66 is illustrated in FIGS. 7, 8 and 9 in assembly with the first shipper bottom 38 of the first disk shipper 30. The manner of performing this transfer operation with the alternative bottom is described as follows.

To accomplish the manual non-rolling transfer of the disks 94 from a compatibly designed disk carrier 66 to the alternative shipper bottom 74, the inverted shipper bottom 74 is lowered into position over the upright disk carrier 66 so that the denticulated rows 78, 80 and 82 in the alternative shipper bottom 74 engage the disks 94 held by the carrier 66, in the manner as illustrated in FIGS. 7 and 8. By firmly holding the alternative shipper bottom 74 and the disk carrier 66 assembly in cooperating alignment, the alternative shipper bottom and disk carrier assembly is carefully inverted to the corresponding position as shown in FIG. 9, so that the disks are now resting on the alternative shipper bottom 74. The cooperating alignment of the dentilulated rows 78, 80 and 82 of the alternative shipper bottom 74 with the disks 94 held by the disk carrier 66 is such that the inversion is accomplished without rolling or dropping of the disks. The disk carrier 66 is then carefully lifted up and away from the disks 94, leaving the disks firmly supported by the denticulated rows 78, 80 and 82 of the alternative shipper bottom 74 in upright parallel spaced-apart axial alignment. The low profile of the alternative shipper bottom 74 permits free access to the disks 94 substantially below their horizontal centerline, so that the disks are now accessible by either ID or OD handling. No more than 30% of the area of the disk is obscured by the denticulated rows 78, 80 and 82 of the shipper bottom 74. This transfer procedure also positions the disks 94 in the alternative shipper bottom 74 in proper alignment for latching attachment of the alt rna-tive shipper cover 96. In transferring the disks from the alternative shipper bottom 74 to a transfer compatible disk carrier 66, the above procedures are reversed in order.

To latch the alternative shipper cover 96 to the alternative shipper bottom 74, the alternative cover 96 is lowered into position over the alternative bottom 74 so that the U-shaped tab 98 on the bottom 74 enters the catch receiving window 124 on the cover 96. The alternative shipper cover 96 is firmly but gently pressed down over the alternative shipper bottom 74 so that the resilient flanges 114, and Preferably the row of crenate scallops 115, in the cover 96 engage the disks 94 held by the alternative shipper bottom 74, as illustrated in FIG. 28. When the alternative shipper 110 is firmly latched, there is a slight biasing cf the resilient flanges 114 of the alternative cover 96 which serves to further stabilize the disks against relative movement. Removal of the alternative shipper cover 96 is accomplished by inward pressure on the catch 104 on each U-shaped tab 98, sliding upwards through the catch receiving window 124. The alternative shipper cover 96 will then "pop up" slightly, due to the release of the slightly biasing spring action of the resilient flanges 114 When the present novel shipper is dimensioned for supporting 65mm disks of 25 disk capacity, the cover 96 is of sufficient width and height that a normal sized hand can simultaneously actuate both latches 104, thus allowing single-handed engagement and removal of cover 96 from bottom 74. The alternative disk shipper 110 has a smooth exterior that permits a heat shrinkable plastic package to be formed around the shipping container if desired and purged with an inert gas to provide additional structural integrity to the shipper and additional protection against environmental contamination.

The assembled shipper packages are designed to be securely stackable with each other. As illustrated in FIGS. 14 and 15, the exterior bed support means 38 on the exterior of the first bottom 10, shown in solid and in phantom line to indicate the stacking configuration, nest over and around the stepped profile 40 on the top member 26 of the first cover 12. The corner bottom supporting feet 102 on the exterior of the alternative bottom 74 nest over and around the stepped profile 130 on the top member 112 of the alternative cover 96, in a manner similar to that illustrated in FIGS. 14 and 15.

Additionally, the shipper bottoms and covers are individually nestable for economy of space. As shown in FIGS. 10, 11, 12 and 13, the generally upstanding walls 42 of the first cover 12 are sufficiently sloped at normal draft angle or greater to permit an unused plurality of first covers 12 to be stacked in a space saving manner. Similarly, the exterior bed support means 38 on the exterior of the first bottom 10 and the latch slot skirt 24 cooperate to permit unused first shipper bottoms 10 to be stacked. The generally upstanding walls 116, 118, 120 and 122 of the alternative 96 are sufficiently sloped at normal draft angle or greater to permit an unused plurality of alternative 96 to be stacked in a space saving manner. Similarly, the exterior corner bottom supporting feet 102 and the latch protecting skirts 106 cooperate to permit unused alternative shipper bottoms 74 to be stacked.

The shippers 2 and 62 may be formed of a rigid material able to securely hold and accurately locate the disks, withstand the rigors of normal shipping and handling, and resist extremes of temperature, pressure and chemicals used in various cleaning operations. The shippers may desirably be transparent or translucent to facilitate visual inspection of contents. A suitable material has been found to be polypropylene co-polymer optionally containing an anti-static protective additive.

The disk shippers can be formed to accommodate any size diameter and thickness of disks. Typical capacities of disk shippers are designed to accommodate up to 25 or up to 50 The disk shippers can preferably be sized to accommodate small 65 mm disks of approximately 0.30 to 0.050 inch thickness. The shippers can be formed with indicia to indicate the capacity, with the indicia arranged to count disks arranged in each slot or in alternating slots.

What is claimed is:

1. A disk shipper containing:
a shipper bottom including a generally rectangular floor member having a disk bed comprising a set of at least three disk supporting longitudinally parallel denticulate rows of ridges to cooperatingly provide at least two arcuate points of support for each disk for maintaining disks in upright lateral parallel spaced-apart axial alignment, and at least one arcuate point of location intermediate the arcuate points of support for maintaining disk position where the shipper bottom is moved out of normal horizontal resting position, the disks optimally containing a central hole concentric with the disk circumference, one part of a two part latch means integrally on each of two opposite sides of the shipper bottom, respectively, the disk bed and the latch configured so that the disks are accessible to internal diameter handling of disks having a central hole and to external diameter handling of disks substantially below the disk horizontal centerline;
a shipper cover including a generally rectangular top member having at least a longitudinal parallel pair of downwardly extending resilient flanges and at least a longitudinal row of downwardly extending crenate scallops parallel to and intermediate between the pair of flanges, said flanges being in cooperating alignment with the denticulate rows of ridges in the disk bed in the shipper bottom for providing two arcuate points of retention for each disk for maintaining the disks in upright lateral parallel spaced-apart axial alignment, and the crenate scallops being in cooperating alignment with the intermediate denticulate row of ridges in the shipper bottom for providing an arcuate point of location for maintaining disk position when the shipper is moved out of normal horizontal resting position, four side walls angled downwardly and slightly outwardly from the top member in minimum non-contact with the peripheral contour of the disks, and part two of a two part latch means integrally on each of two opposite walls, respectively, in cooperating alignment with part one of a two part latch means on the bottom;
so that the shipper cover is matable with the shipper bottom with the flanges and scallops in the cover cooperating with the denticulate rows of ridges in the disk bed in the bottom to Provide upright lateral parallel spaced apart axial alignment of the disks, and with each one part of the two part latch means in the bottom cooperating with a part two of the two part latch means on the cover to provide latching of the bottom with the cover, thus provided a secure package for transportation, handling and storage of disks.

2. The disk shipper according to claim 1, wherein the shipper bottom is further provided with Part one of a first two part continuous seal substantially surrounding the disk bed, wherein the shipper cover walls terminate in part two of a first two part continuous seal substantially surrounding the perimeter of the four sides in cooperating alignment with part one of the first seal on the bottom, so that part one of the first seal on the bottom cooperates with part two of the first seal on the cover to provide a first continuous seal of the cover with the bottom.

3. The disk shipper according to claim 2, wherein part one of the first seal is a pair of Parallel ridges of substantially even height throughout, with the exterior ridge formed with a gradual downward taper in the latch area, and wherein Part two of the first seal is a lip for cooperating engagement between the ridges of part one of the first seal on the bottom.

4. A disk shipper according to claim 2, wherein the shipper bottom is further provided with a cover positioning member extending upwards from the floor Perimeter in cooperating alignment with a bottom positioning member on the cover extending downward from the walls of the cover, the cover positioning member configured so that the disks are accessible to internal diameter handling of disks having a central hold and to external diameter handling of disks substantially below the disk horizontal centerline.

5. A disk shipper according to claim 4, wherein the bottom positioning member extends continuously around the cover, the cover positioning member extends continuously around the bottom, the bottom positioning member extends over and around the cover Positioning member, so that the cover and bottom Positioning members together form a second continuous seal exterior to the first continuous seal.

6. A disk shipper according to claim 1, wherein the denticulate rows of ridges of the disk bed are arranged to provide two points of arcuate support and one point of arcuate location for the perimeter of each disk, a central location Point at the lateral center of the floor, and two side support joints at a height slightly less than the height of the bottom, and wherein the flanges in the cover are slightly resiliently deflected outward in supporting the disks when the cover is in latching attachment with the bottom.

7. A disk shipper according to claim 6, wherein the profile of the central row ridges is generally semi-circular and the disks are contacted between upper parts of adjacent ridges only the shipper bottom is moved out of normal horizontal resting position, and wherein the profile of the side row ridges is generally semi-oval and the disks are contacted by the cusps between adjacent ridges.

8. A disk shipper according to claim 1, wherein the two Part latch means consists of part one, a U-shaped depressible tab for engaging part two, a tab-retaining window, the U-shaped tab base being coextensive with bottom-supporting feet, the U-shaped tab terminating in an upstanding catch higher than the bottom perimeter for secure latching within the tab-retaining window, the bottom further provided with downward extending skirt and and outward extending ears adjacent the U-shaped depressible tab to protect the engaged tab from accidental disengagement.

9. A disk shipper according to claim 1 wherein the flanges are a single parallel pair of mirror image rows molded into the top of the cover.

10. A disk shipper according to claim 2, wherein the first two part continuous seal is a dust-proof labyrinth seal.

11. A disk shipper according to claim 1, wherein covers of like disk shippers are nestable when empty with minimum non-contact of leaves, seal and side walls of cover interiors.

12. A disk shipper according to claim 1, wherein bottoms of like disk shippers are nestable when empty with minimum non-contact of bed and seal of bottom interiors.

13. A disk shipper according to claim 1, wherein the shipper has a smooth exterior for enclosing with shrink wrap or sealing tape.

14. A disk shipper according to claim 1, wherein the exterior of the cover and the exterior of the bottom are provided with means for secure stacking of like disk shippers for storage and transportation.

15. A disk shipper according to claim 1, sized and arranged for supporting a set of 25 central hole disks of 65-mm diameter 16. A disk shipper according to claim 1, wherein the cover and bottom are formed of polypropylene copolymer optionally containing an anti-static protective additive.

17. A package for disks and disk like materials comprising:
 a package bottom having a floor member and provided with a set of at least three longitudinally parallel denticulate rows of ridges to cooperatingly provide at least two arcuate points of support for each disk for maintaining the disks in upright lateral Parallel spaced-apart axial alignment, and at least one arcuate point of location intermediate the arcuate points of support for maintaining disk position when the shipper bottom is moved out of normal horizontal resting position, the disks optimally containing a central hole concentric with the disk circumference, part one of a two part latch means integrally on opposing sides of the package bottom, respectively, disk bed and latch means configured so that the disks are accessible to handling both by their internal diameter, of disks having a central hole, and by their external diameter substantially below their horizontal centerline;
 a package cover for enclosing the package bottom and disks in spaced axial relationship therein, a longitudinal Parallel pair of downwardly extending resilient disk retaining flanges and a longitudinal row of downwardly extending crenate scallops, said flanges and said scallops being in cooperating alignment with the denticulate rows of ridges in the disk bed in the shipper bottom for maintaining the disks in upright lateral parallel spaced-apart axial alignment and preventing relative transverse and lateral motion of the disks within the package, and part two of a two part latch means on opposing sides of the package cover for latching with part one of the two part latch means on the package bottom;
so that the shipper cover is matable with the shipper bottom with the disk locating flanges and scallops in the cover cooperating with the disk bed in the bottom to provide upright parallel spaced axial alignment of the disks, and with each part one of the two part latch means on the bottom cooperating with a part two of the two part latch means on the cover to provide latching of the bottom with the cover, thus providing a secure package for transportation, handling and storage of disks.

18. A package according to claim 17, wherein the Package bottom is further provided with part one of a first two part continuous seal substantially surrounding the disk bed, the package cover is further provided with part two of a first two part continuous seal around the cover perimeter for sealing with part one of the first seal on the Package bottom.

19. A package according to claim 17, sized and arranged for supporting a set of 25 central hole disks of 65 mm diameter.

20. A package according to claim 17, wherein the Package cover exterior and the package bottom exterior are provided with means for secure stacking of like packages for storage and transportation.

21. A package according to claim 17, wherein Package covers of like packages and package bottoms of like packages are individually nestable when empty with minimum non-contact of cover and bottom interiors, respectively.

22. A disk shipper according to claim 1 wherein the shipper bottom is transfer compatible with a disk carrier, the disk carrier having opposed side walls for carrying a plurality of axially aligned disks therebetween, an open top through which disks may be inserted and ejected, end walls joining the side walls, a bottom having disk support surfaces engaging and supporting the disks in upright parallel spaced-apart axial alignment, the disk support surfaces of the disk carrier and the disk supporting denticulate rows of bumps of the shipper bottom defining the same radius of disk curvature, maintaining the same axial disk spacing between the Plurality of disks, and having the same total disk capacity, the side walls of the disk carrier configured to allow the plurality of disks to be engaged and supported by both the disk support surfaces of the disk carrier and by the disk supporting denticulate rows of the shipper bottom simultaneously, so that the disk can be transferred from the shipper bottom to the disk carrier and from the disk carrier to the shipper bottom in a non-rolling transfer.

23. A package for disks and disk like materials according to claim 17 wherein: the shipper bottom is transfer compatible with a disk carrier, the disk carrier having opposed side walls for carrying a Plurality of axially aligned disks therebetween, an open top through which disks may be inserted and ejected, end walls joining the side walls, a base having disk support surfaces engaging and supporting the disks in upright parallel spaced-apart axial alignment, the disk support surfaces of the disk carrier and the disk supporting denticulate rows of the shipper bottom defining the same radius of disk curvature, maintaining the same axial disk spacing between the plurality of disks, and having the same total disk capacity, the side walls of the disk carrier configured to allow the plurality of disks be engaged and supported by both the disk support surfaces of the disk carrier and by the disk supporting serrated rows of the shipper bottom simultaneously, so that the disk can be transferred from the shipper bottom to the disk carrier and from the disk carrier to the shipper bottom in a non-rolling transfer.

* * * * *

UNITED STATES PATENT AND TRADEMARK OFFICE
CERTIFICATE OF CORRECTION

PATENT NO. : 5,046,615

DATED : September 10, 1991

INVENTOR(S) : Robert J. Nentl, et al

It is certified that error appears in the above-identified patent and that said Letters Patent is hereby corrected as shown below:

```
at col. 13, line 24, "where" should read --when--;
at col. 13, line 25, "cf" should read --of--;
at col. 13, line 62, "Provide" should read --provide--;
at col. 14, line 2, "Part" should read --part--;
at col. 14, line 13, "Parallel" should read --parallel--;
at col. 14, line 16, "Part" should read --part--;
at col. 14, line 21, "Pe-" should read --pe---;
at col. 14, line 34, "Positioning" should read --positioning--;
at col. 14, line 34, "Posi-" should read --posi---;
at col. 14, line 41, "Point" should read --point--;
at col. 14, line 42, "joints" should read --points--;
at col. 14, line 56, "Part" should read --part--;
```

UNITED STATES PATENT AND TRADEMARK OFFICE
CERTIFICATE OF CORRECTION

PATENT NO. : 5,046,615

DATED : September 10, 1991

INVENTOR(S) : Robert J. Nentl, et al

It is certified that error appears in the above-identified patent and that said Letters Patent is hereby corrected as shown below:

at col. 15, line 31, "cf" should read --of--;
at col. 15, line 33, "Parallel" should read --parallel--;
at col. 16, line 6, "Package" should read --package--;
at col. 16, line 11, "Package" should read --package--;
at col. 16, line 16, "Package" should read --package--;
at col. 16, line 19, "Pack-" should read --pack---;
at col. 16, line 36, "Plurality" should read --plurality--;
and
at col. 16, line 48, "Plurality" should read --plurality--.

Signed and Sealed this

Thirtieth Day of March, 1993

Attest:

STEPHEN G. KUNIN

*Attesting Officer*     Acting Commissioner of Patents and Trademarks